United States Patent [19]
Gerber

[11] 3,842,296
[45] Oct. 15, 1974

[54] ADJUSTABLE ROTATION-CONTROLLING DEVICE FOR SYNCHRONOUS MOTOR

[75] Inventor: Hermann Gerber, Courgevaux, Switzerland

[73] Assignee: SAIA A.G. Fabrik elektrischer Apparate, Canton of Fribourg, Switzerland

[22] Filed: June 19, 1973

[21] Appl. No.: 371,383

[30] Foreign Application Priority Data
June 30, 1972  Switzerland.......................... 9820/72

[52] U.S. Cl. .................................. 310/41, 310/162
[51] Int. Cl. ............................................. H02k 7/10
[58] Field of Search ........................... 310/162–164, 310/41

[56] References Cited
UNITED STATES PATENTS
2,722,297  11/1955  Gates, Jr. ...................... 310/41 UX
2,874,809  2/1959  Roole ............................. 310/41 UX
3,501,658  3/1970  Morley ................................. 310/41
3,710,155  1/1973  Jullien-Davin ....................... 310/41

FOREIGN PATENTS OR APPLICATIONS
588,000  5/1947  Great Britain ....................... 310/41

Primary Examiner—D. F. Duggan
Attorney, Agent, or Firm—Imirie, Smiley & Linn

[57] ABSTRACT

A synchronous motor of which the rotor may start in two opposite directions when the stator is energized, the rotor being coupled with locking means movable in accordance with the starting direction of the rotor, movement of said locking means in one direction resulting in locking and reversing of the initial rotation of the rotor and said locking means being adjustable into two conditions for preventing in each condition starting of the rotor in one direction.

14 Claims, 8 Drawing Figures

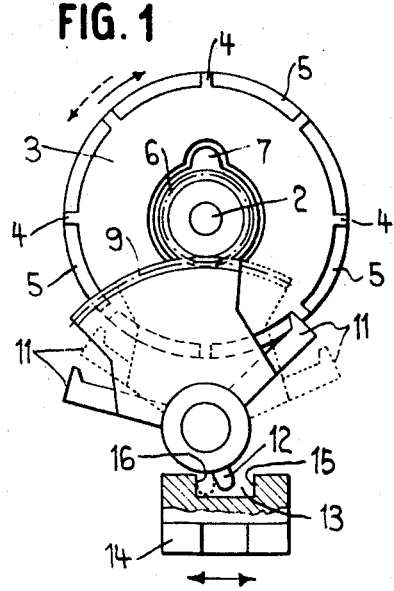
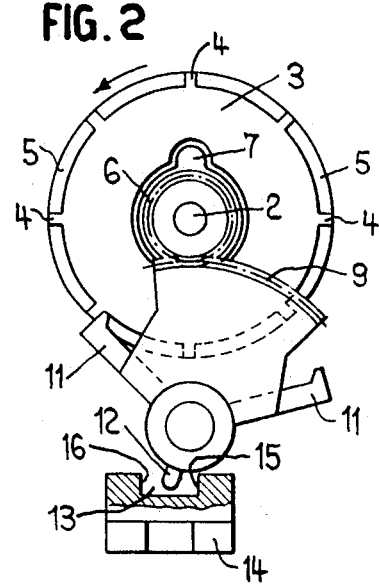
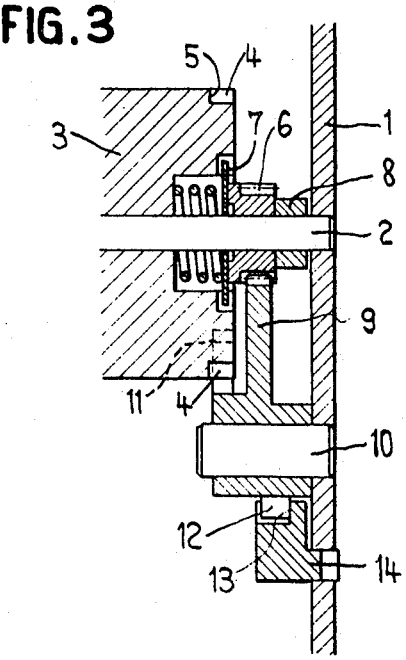

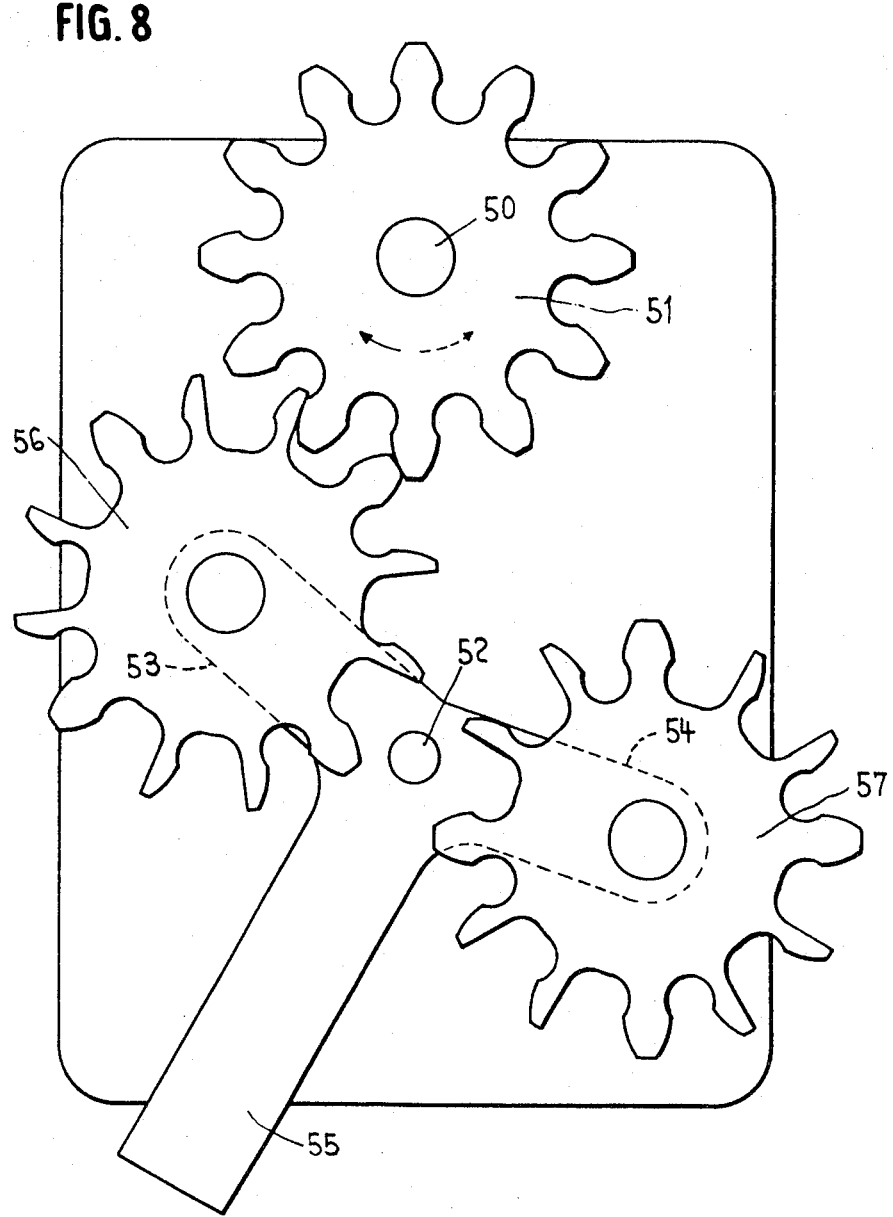

ADJUSTABLE ROTATION-CONTROLLING DEVICE FOR SYNCHRONOUS MOTOR

BACKGROUND OF THE INVENTION

This invention relates to a synchronous motor, particularly a small synchronous motor having a locking device acting onto the rotor, said device being adjustable into two operating positions such that running of the rotor in one of its rotating directions is locked for each of said operating positions of the locking device. In spite of the absence of an auxiliary phase-shifted field determining the starting direction of the motor the starting direction may be preselected by simple mechanical means.

In a prior synchronous motor of the above type a swingably mounted forked locking spring may be shifted into two locking positions such that for each position the one or other arm of the forked spring acts as a stop pawl onto a stop pin fixed on the rotor of the motor (German Pat. No. 676,987). During normal operation of the motor, the one arm of the locking spring always remains in the path of the stop pin and the spring arm is lifted each time the pin passes below it. This not only results in friction and wear, but when the motor stops it may well be that the stop pin just runs below the spring arm and comes at rest in a position where the one spring arm elastically presses onto the pin. The friction between the stop pin and the arm of the locking spring is such that the rotor may not start at all when energized the next time because the friction between the stop pin and the one arm of the locking spring may also cause the rotor to stop in a particularly unfavourable position relatively to the stator poles such that no sufficient starting moment is produced when the motor is energized again.

SUMMARY OF THE INVENTION

It is an object of this invention to provide a locking device for selectively and reliably starting in clockwise or anticlockwise direction. The synchronous motor according to this invention favourably distinguishes from the prior art in that for each operating position of the locking device a locking member is coupled with the rotor and is capable of being displaced into a locking position by rotation of the rotor in one of its rotating directions. Since the locking member is driven by the rotor until it abuts against a stop whereby the rotor is blocked when it starts in the wrong direction it is possible to use a rigid locking member which does not brake the rotor by elastic pressure against a stop pin of the latter. The forces required for driving the locking member are practically without any importance and thus cannot disturb normal operation. The life time of the locking device is high.

BRIEF DESCRIPTION OF THE DRAWING

FIGS. 1 and 2 schematically show two operating positions of a first locking gear, FIG. 3 is a section of the locking gear of FIGS. 1 and 2.

Figure 4:
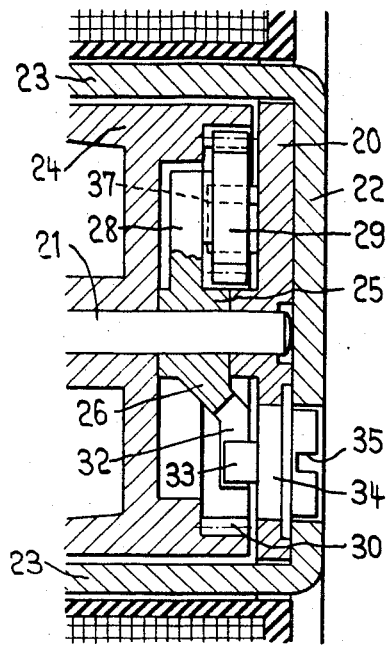
FIG. 4 is a section view of another locking gear.

The synchronous motor shown in FIGS. 1 – 3 has a casing of which a part of the one side wall 1 is illustrated in FIG. 3. The rotor shaft 2 is pivoted in side wall 1. A portion 3 of the rotor which is only partially illustrated has an external toothing comprising teeth 4 and gaps 5. A pinion 6 is loosely mounted on the rotor shaft 3 between a spring-loaded disc 7 loosely mounted on the shaft 2 and a ring 8 fixed on shaft 2. A friction coupling or clutch is thus formed between shaft 2 respectively rotor portion 3 and pinion 6 such that the rotor tends to drive the pinion 6 with a limited torque.

Pinion 6 meshes with a toothed segment 9 swingably mounted on a shaft 10. The segment 9 is made in one piece with two locking pawls 11. The hub of segment 9 has a stop tooth 12 engaging a gap 13 in a stop slider 14 shiftably mounted in the direction of the arrow in FIG. 1 within a slit of casing wall 1. The lateral stop surfaces 15 and 16 of gap 13 form stops for the stop tooth 12 whereby the one or other stop surface is efficient according to the position of slide 14.

Operation of the locking device shown in FIGS. 1 to 3 is as follows. If the slide 14 is in the position shown in FIG. 1 and the rotor initially starts in clockwise direction, that is in the direction of the arrow shown in full lines in FIG. 1, the segment 9 is driven in anticlockwise direction. The tooth 12 is free to leave the adjacent stop surface 16 and allows a swinging motion of segment 9 until the right-hand stop pawl 11 engages the toothing 4, 5 of the rotor as shown in FIG. 1 and locks further rotation of the rotor. The rotor will now start in the opposite direction whereby the segment 9 is now rotated back in clockwise direction, the right-hand stop pawl 11 being thereby disengaged before the next tooth 4 of the rotor abuts against it. The rotating motion of segment 9 in clockwise direction is limited by abutment of its tooth 12 against the effective stop surface 16 of slide 14 such that the stop pawls 11 are maintained in their symmetrical middle position shown in broken lines in FIG. 1. The rotor will continue to rotate in anticlockwise direction as shown by the arrow in broken lines in FIG. 1.

FIG. 2 shows the other possible operating position of the locking gear, whereby the slide 14 is shifted to the left such that its stop surface 15 is operative. In this case the segment 9 may only be rotated in clockwise direction for locking the rotor when it initially tends to start in anticlockwise direction as indicated by the arrow in full lines of FIG. 2. The locking position of the left-hand stop pawl 11 is shown in full lines. However, when the rotor initially starts in clockwise direction the segment 9 with its stop pawls 11 cannot leave its central position shown in broken lines because the tooth 12 abuts against the stop surface 15. The rotating direction of the rotor in clockwise direction is thus predetermined.

Figure 5:
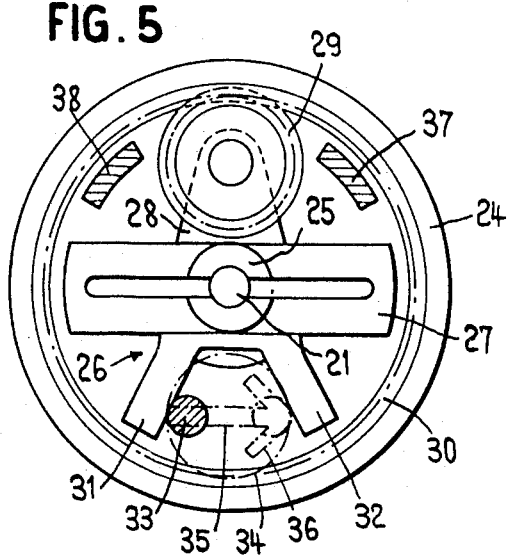
FIG. 5 is a side view of the locking gear of FIG. 4.

FIGS. 4 and 5 show another embodiment. Except for a casing wall 20 wherein the rotor shaft 21 is pivoted, FIG. 4 also shows a part 22 of the stator stamped from sheet metal and having stator poles 23. The hub 25 of a support 26 is pivotably mounted with very low friction in the shaft 21 of rotor 24. The hub 25 has two portions interconnected by means of an elongated slotted portion 27, these portions being so dimensioned that the hub portions are slightly applied against the rotor shaft 21. A toothed wheel 29 is rotatably mounted at the free end of an upwardly extending arm 28 of support 26. Toothed wheel 29 meshes with the internal toothing 30 of rotor 24. The support 26 has a downwardly extending fork the arms 31 and 32 of which form stops cooperating with a stop pin 33. Stop pin 33 is excentrically disposed on an adjusting screw 34 rotatably mounted in the casing of the motor. The slit 35 of the screw 34 forms an arrow together with a groove 36, this arrow formed at the visible and accessible outer side of the adjusting screw indicating the starting direction of the motor. Stops 37 and 38 are formed at the casing wall 20.

When the stop pin 33 is in the position as shown in FIG. 5 arm 31 of the fork contacts the stop pin. Therefore, support 26 may only leave the illustrated central position in clockwise direction. If the rotor initially starts in clockwise direction, the forces acting from the shaft 21 onto hub 25 and from the internal toothing 30 onto toothed wheel 29 rotate the support 26 in clockwise direction. As soon as the toothing of the toothed wheel 29 abuts against stop 37 rotation of the toothed wheel and thus rotation of the rotor is blocked. The rotor is now started in the opposite direction and drives the support 26 with the toothed wheel 29 pivotably mounted thereon in anticlockwise direction. As soon as support 26 has again reached the illustrated symmetrical central position between stops 37 and 38, arm 31 of the fork abuts against stop pin 33 thereby preventing further rotation of the support 26 in anticlockwise direction. Rotation of the rotor in anticlockwise direction will thus no longer be hindered because toothed wheel 29 remains in its central position as illustrated in FIG. 5 and freely rotates with the rotor.

In order to select the other rotating direction, stop screw 34 is turned by 180° whereby the stop pin 33 is turned to a position for cooperation with stop arm 32. With this adjustment the support 26 may follow rotation of the rotor 24 in anticlockwise direction such that this rotating direction is locked by engagement of the toothed wheel 29 with stop 38. Therefore, the rotor will finally start in clockwise direction, this being indicated by the arrow on stop screw 34.

Figure 6:
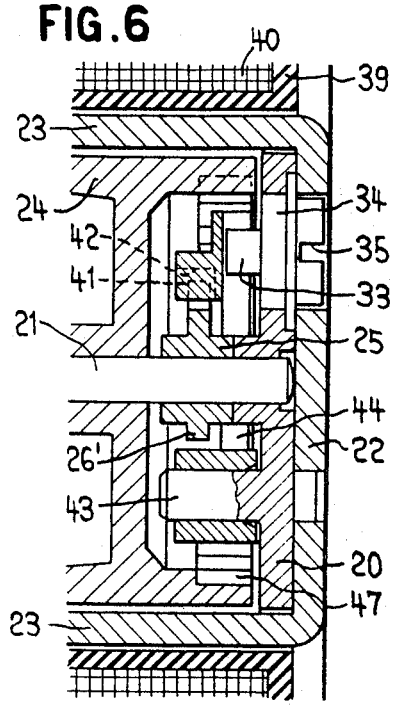
FIG. 6 is a section view of a further locking gear.
Figure 7:
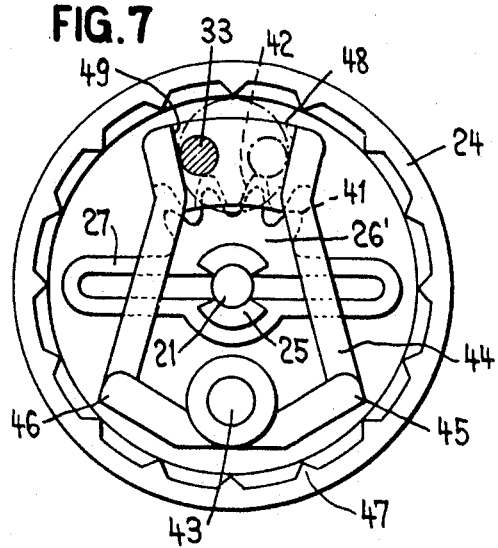
FIG. 7 is a side view of the locking gear of FIG. 6 and FIG. 8 schematically shows another embodiment of the invention.

In FIGS. 6 and 7 which show another embodiment of the invention, similar parts are designated by the same reference numerals as in FIGS. 4 and 5. Except for the parts of the motor shown in FIGS. 4 and 5, FIG. 6 also illustrates a portion of the coil carrier 39 and of the coil 40 of the motor. The two parts of a hub 25 formed integrally with an elastic support 26' are mounted on the rotor shaft. Support 26' has a toothing 41 meshing with a toothed segment 42 of a frame 44 pivotably mounted on a shaft 43. The corners 45 and 46 of this frame form stops cooperating with a toothing 47 of rotor 24. The frame 44 also has stop surfaces 48 and 49 cooperating with the stop pin 33.

If the stop pin 33 is in the position shown in full lines in FIG. 7 in contact with the stop surface 49, the frame 44 is only able to rotate in anticlockwise direction from the illustrated neutral middle position. This happens when the rotor initially starts in anticlockwise direction and drives the frame 44 in anticlockwise direction through toothings 41 and 42. The corner 46 of the frame will soon engage the toothing 47 of the rotor and lock further rotation thereof. The rotor will thus be started in clockwise direction. It will thereby drive the frame 44 through carrier 26 and toothings 41 and 42 only back into its neutral middle position as illustrated in FIG. 7 such that further rotation of the rotor in clockwise direction is no longer hindered. By reversal of the stop pin 33 into the position shown in broken lines, rotation of the frame 44 in clockwise direction is prevented such that the rotor will now finally start in anticlockwise direction.

FIG. 8 schematically shows another reversible locking gear. A toothed wheel 51 having a usual involute toothing is fixed on the motor shaft 50. Two locking wheels 56 and 57 are mounted for free rotation on arms 53 and 54 respectively of a cradle swingable round shaft 52 and having an actuating lever 55. By swinging of the cradle round shaft 52 the one or other locking wheel may be brought into meshing condition with the toothed wheel 51 as shown for locking wheel 56. Each third tooth of both locking wheels 56 and 57 has a complete profile corresponding to the profile of the teeth of wheel 51. All remaining teeth of wheels 56 and 57 have only a half profile, that is, the half of the tooth profile at one side of an imagined axial symmetry plane of a full tooth profile is removed, the half of the tooth profile situated in clockwise direction being removed on wheel 56 and the half of the tooth profile situated in anticlockwise direction being removed on wheel 57.

If the locking gear is in the illustrated position, that is, if the locking wheel 56 meshes with toothed wheel 51, the rotor is blocked if it initially tends to start in clockwise direction as shown by an arrow in full lines in FIG. 8. Since in this case the teeth of wheel 51 contact the locking wheel 56 at the side where one tooth half has been removed, the next tooth of the locking wheel 56 will no longer mesh correctly into the following gap of wheel 51 as indicated in FIG. 8, but will abut against the crest of the following tooth of wheel 51 such that further rotation of the toothed wheels and thus of the rotor is blocked. If the rotor now is reversed and starts to rotate in anticlockwise direction as indicated by an arrow in broken lines, the teeth of wheel 51 always act onto the remaining half profiles of the teeth of the locking wheel. The locking wheel is thus continuously driven like a normal toothed wheel and has no locking action whatever. If the locking wheels are partially equiped with full teeth, whereby every second tooth, but preferably every third tooth is a full one, there is a high probability that locking is effected by a full tooth which has more strength and will thus easier stand the stresses occurring when locking the rotor than a tooth of which one half of the profile is omitted.

If the locking wheel 56 is disengaged and the locking wheel 57 is engaged with toothed wheel 51, the other rotating direction of the rotor is locked. Of course a locking gear as shown in FIG. 8 may preferably be used also if one rotating direction only of the rotor has to be blocked, whereby one locking wheel may be mounted on a stationary shaft and may continuously remain in gear with the toothed wheel 51.

A locking gear as shown in FIG. 8 is not only very simple but also produces extremely low losses by the friction of the locking wheel to be driven by the rotor during normal operation.

A magnetic coupling, an eddy-current coupling or the like may be provided instead of the friction coupling shown in FIGS. 1 - 3. Such a coupling or a friction coupling may be disposed between a locking element and a toothed wheel continuously driven by a pinion fixed on the motor shaft. The permanent magnet poles of the rotor might be used as parts of a magnetic coupling provided instead of the illustrated friction coupling.

Other locking means may be provided, for instance a cradle swingable into two operating positions and having rotatable locking bodies adapted to be wedged between a wedge surface of the cradle and a surface of the rotor. Each rotatable body would be wedged and stop the rotor for one of the rotating directions of the latter.

What I claim is:

1. In a synchronous motor having a locking device acting onto the rotor, wherein said device is adjustable into two operating positions, running of the rotor in one of its rotating directions being locked for each of said operating positions of the locking device, the improvement wherein said rotor has a locking toothing uniformly distributed round its circumference and for each operating position a locking member is coupled by torque transmitting means with the rotor and is capable of being rotated into a locking position in engagement with said locking toothing by rotation of the rotor in one of its rotating directions.

2. A synchronous motor according to claim 1, comprising stop means adjustable into two operating positions for said locking member, allowing displacement of said locking member into a locking position in one of two opposite directions for each of said operating positions of said stop means, such that the rotor is able to start in the one or other direction in accordance with the positions of said stop means.

3. A synchronous motor according to claim 2, wherein said torque transmitting means is a torque transmitting coupling between the rotor and said locking member.

4. A synchronous motor according to claim 3, wherein said coupling is on said rotor, the one half of said coupling engaging a swingably mounted locking member.

5. A synchronous motor according to claim 4, wherein a toothed wheel is loosely mounted on the rotor shaft between a first friction member fixed on the rotor shaft and a second spring loaded friction member loosely mounted on the rotor shaft, said toothed wheel meshing with a toothed segment of said locking member.

6. A synchronous motor according to claim 1, comprising a swingably mounted locking member having pawls swingable into said locking toothing of the rotor, said locking member cooperating with adjustable stop means.

7. A synchronous motor according to claim 6, wherein said pawls are disposed for engagement into an external locking toothing of the rotor.

8. A synchronous motor according to claim 6, wherein said locking member has a tooth engaging between adjustable stop surfaces.

9. A synchronous motor according to claim 6, wherein said pawls are disposed for engagement into an internal locking toothing of the rotor.

10. In a synchronous motor having a locking device acting onto the rotor, wherein said device is adjustable into two operating positions, running of the rotor in one of its rotating directions being locked for each of said operating positions of the locking device, the improvement wherein a first toothed wheel rotatably mounted on a swingable lever gears with a second toothed wheel fixed on the rotor, said swingable arm cooperating with a stop adjustable into two positions, said stop allowing for each of its positions a swinging movement of said swingable arm into the one of two opposite end positions, said first toothed wheel engaging a locking tooth in each of said end positions of said swingable arm.

11. A synchronous motor according to claim 10, wherein said swingable arm is rotatably mounted on the rotor shaft.

12. A synchronous motor having a locking device acting onto the rotor, wherein said device is adjustable into two operating positions, running of the rotor in one of its rotating directions being locked for each of said operating positions of the locking device, comprising a toothed wheel having teeth of symmetrical profile and fixed on the rotor shaft, a cradle with a pair of toothed locking wheels rotatably mounted thereon, said cradle being swingable round an axis for selectively engaging the one of said locking wheels with said toothed wheel, said locking wheels having each a number of teeth of which the profile corresponds to one half situated at one side of an axial symmetry plane of the profile of the teeth of the toothed wheel, such halves of tooth profiles being omitted at opposite sides on the locking wheels.

13. A synchronous motor according to claim 12, wherein said locking wheels also have teeth with a complete symmetrical profile.

14. A synchronous motor according to claim 13, wherein each third tooth of said locking wheels has a symmetrical profile.

* * * * *